United States Patent Office 3,168,602
Patented Feb. 2, 1965

3,168,602
BAKING TAR BONDED BRICK
Ben Davies and Ernest P. Weaver, Pittsburgh, Pa., assignors to Harbison-Walker Refractories Company, Pittsburgh, Pa., a corporation of Pennsylvania
No Drawing. Filed May 8, 1963, Ser. No. 279,012
11 Claims. (Cl. 264—29)

This application is a continuation in part of our copending application Serial Number 152,149, of the same title, filed November 14, 1961, now abandoned in favor of the present application. This invention relates to refractory brick particularly suited for use in lining vessels for the oxygen steelmaking process.

The oxygen steelmaking process, variously termed the LD process, the Kaldo process or the oxygen converter process, requires a vessel somewhat similar in shape to the well-known Bessemer and Thomas converters lined with refractory. A basic slag is produced in this process and, accordingly, a refractory of basic composition is used. This factor has led to the widespread use, both in this country and in Europe, of refractory brick of dead burned dolomite or dead burned dolomite-magnesite mixtures bonded with a cokable, non-aqueous tar or pitch.

Magnesite and dolomite of high purity possess great refractoriness and, therefore, are capable of withstanding the exceedingly high temperatures encountered in the oxygen converter process. Dolomite is a desirable constituent of the refractory not only for economic reasons but also because, as noted in the copending application, King and Davies, Serial Number 38,438, now abandoned in favor of continuation-in-part application 266,796, which was filed March 21, 1963, having the same title and inventors, the presence of lime (CaO) greatly improves the resistance of the refractory to attack by the slag. However, it is well-known that lime, and to a much lesser extent magnesia, are extremely susceptible to hydration from moisture in the atmosphere and this characteristic has seriously curtailed its use as a refractory material, although its extremely high melting point of 4676° F. has led to innumerable attempts to overcome this. Generally, such attempts have taken the form of chemical additives such as clay, silica, iron oxide, titania, zirconia and many others which react with the lime and "stabilize" it. Nevertheless, when a sufficient quantity of such stabilizing agents had been added to forestal hydration, the physical qualities of lime, particularly its high melting point, have been seriously modified.

Another means for inhibiting the hydration of lime-containing bodies has been to coat the grains or the formed body with a non-aqueous oil or pitch. This coating excludes the moisture of the atmosphere but can give only temporary protection. This is the principle upon which the tar or pitch bonded brick of the oxygen vessel are produced. The pitch not only bonds the refractory grains into a strong body but also provides temporary protection from hydration. This protection is recognized to be very transient, particularly during the hot, humid days of summer, and serious losses have been incurred where brick were unforseeably delayed in being installed in service.

It is the primary object of the present invention to provide a novel process by which materially improved resistance to hydration is imparted to tar or pitch bonded bodies of magnesia and lime, which process can be practiced with presently available skills and facilities.

The baking of tar bonded brick is known in the art. Prior workers have heated such bodies at temperatures ranging from 300° F. to as high as 2450° F. and for times varying from 30 minutes to 200 hours. It will be understood that in this baking process the volatiles in the tar are driven off leaving a coating of higher melting tar, or of carbon if high temperatures are used. Heating at low temperatures for a short period of time produces only a thin surface layer of baked material which acts to retard hydration. This latter feature, while beneficial, does not provide the more lasting protection resulting from baking a block to the middle of it. The heating of a block at high temperatures, while insuring complete baking, burns off substantially all the volatiles from the tar, and even all or part of the carbon, causing a sharp decrease in bonding strength leading to physical weakness in the body. It also destroys the completeness of the organic film thus reducing effective resistance to hydration. This weakness in the brick makes them less resistant to the physical shock and abrasion present in the steelmaking process, particularly during the charging step when molten iron and solid scrap are fed into an oxygen steelmaking vessel. Therefore, it has been realized that to obtain brick of high resistance to hydration but yet able to withstand mechanical abuse, they must be baked completely through but not at such a high temperature that their strength is seriously impaired.

It is in this complete baking process that prior workers have observed a phenomenon which has precluded the use of such baked shapes in the oxygen converter. When a standard key shape, 18 x 6 x 3 inches, or even a 9 inch straight (9 x 4½ x 2½ inches) is heated to the desired temperature and held for a sufficient time to cause complete baking, a roughened surface frequently results and numerous cracks are formed. When tar bonded bodies are heated, volatile components of the tar are expelled. This volatilization leads to the disruptions and non-conformities in the brick noted above. This, of course, substantially decreases the strength of the brick and deleteriously affects their resistance to the slag.

These and other problems are overcome in accordance with our discoveries involving the baking of tar bonded refractory shapes such as brick. These discoveries are that three critical factors are interrelated in producing such refractory shapes that have good sufaces, are free from cracks, are hydration resistant and have sufficient strength for practical application. First, the shapes must be baked at a temperature within the range of 400° F. to 1000° F., preferably about 550° to 650° F., for about 1 to 24 hours. Second, to achieve this temperature, the tar bonded shapes must be heated slowly, that is within the range of about 25° to 100° F., and preferably 40° to 60° F. per hour, to reach a final baking temperature. The third critical factor is that the baking is carried out in a manner such that the shapes are subjected to a super-atmospheric pressure, preferably developed autogenously. In this manner, the volatiles within the shape being baked are not expelled from the shape so rapidly that cracks are produced. The advantageous organic film results, which contributes to hydration resistance. The various constituents of the tar or pitch bonding material tend to polymerize more smoothly and there appears to be less amorphous carbon or graphite formed. Moreover, complete baking in this manner results in a shape free from warpage and which has strength adequate for the intended application. During pressing of brick, many refractory grains containing lime are broken and cracked exposing fresh surfaces not coated with tar or pitch. These surfaces are particularly susceptible to hydration. We have postulated that where the volatiles are driven off slowly a film of polymerized material is deposited on the grains and these fresh surfaces are thereby coated against the effects of hydration.

It will be apparent that the three critical factors indicated can readily be achieved by use of skills and facilities presently available to the art. Thus, the heating rate and the temperature for baking are attainable with the heating facilities now used in preparing refractory articles. The pressure can be produced in a plurality of ways. For example, the shapes can be placed in a muffle furnace and heated. The refractory shape can be placed within a metal shape that encloses it on its top and all sides and then sand is packed around the bottom of the unit. Then as the temperature is raised, the volatiles will build up a superatmospheric pressure within the unit. Other ways of producing such a pressure will be apparent to those skilled in the art. The essence of this aspect of the invention is that a superatmospheric pressure be produced to retard volatilization of light fractions in the pitch and to exclude the atmosphere during the baking period. A moderate pressure on the order of a few inches of water to 5 p.s.i. above atmospheric is adequate for this purpose. Higher pressure can, of course, be used, but the economics of using higher pressures generally do not justify any result that can be attributed to higher pressure.

While the present invention is of primary interest with respect to producing refractory brick of dead burned dolomite or dead burned dolomite-magnesite mixtures, for example where the CaO content can range from about 5 to 50 weight percent, it should be apparent that the invention can be applied to refractory shapes of any composition. This is so because the primary effect of the critical limitations is exerted on the tar or pitch bonding material and not on the refractory aggregate. Nevertheless, the preferred aggregates are basic in character since these are generally used to line oxygen converters. Furthermore, as the chief purpose of the baking procedure is to inhibit hydration, dead burned magnesite, dolomite or lime, or mixtures thereof, constitute the usual aggregates.

Refractory shapes suitable for the practice of this invention are produced according to the techniques presently used in forming tar bonded basic refractories. Generally, the tar or pitch bonding agent is heated to about 100° F. above its softening point, or to such a temperature that renders the bonding agent fluid. Then the coarse portion of the aggregate is mixed with the liquefied pitch. The coarse portion is usually heated before being blended into the pitch so that all the grains are completely coated. The fine fraction of the aggregate is thereafter mixed into the batch. If desired, powdered pitch may likewise be added in accordance with the invention in our copending application, Serial Number 101,345, filed April 7, 1961, now Patent 3,070,449, in order to increase the carbon content and to give a wider temperature range for the release of volatiles. Brick or other shapes are formed from the batch by pressing, extrusion, vibration, or other conventional methods.

The words tar and pitch are used in the present application in the same manner as in the prior art. That is, they are intended to indicate both petroleum base and coal base materials. Moreover, there is no distinction made in the refractories art between pitch and tar, both being taken to mean the same thing. The usual bonding tar or pitch is known as a medium pitch and it is distinguished by a softening point within the range of about 150° F. to 250° F. and by being hardenable upon cooling to room temperature.

The invention will be described further in conjunction with the following example in which the details are given by way of illustration and not by way of limitation.

EXAMPLE I

A refractory batch was formed, by weight, of 60 percent of coarse dead burned dolomite and 40 percent of fine dead burned seawater magnesia. One half of the dolomite was sized to pass a ⅜ inch screen and one half of it passed a 3/16 inch screen. The magnesia formed the fine fraction of the mix, all of it being minus 65 Tyler mesh. A typical screen analysis of this mix in weight percent is as follows:

| | Percent |
|---|---|
| +4 mesh | 30 |
| −4+10 | 25 |
| −10+28 | 3 |
| −28+65 | 1 |
| −65 | 41 |

The dolomite was heated and then blended with a pitch having a softening point of about 150° F. The pitch had been liquefied by heating to about 270° F. to insure adequate fluidity for mixing and forming. The fine magnesia was then admixed into the batch in an unheated condition. Brick, 9 x 4½ x 2½ inches, were pressed at 8000 p.s.i. and a temperature of 270° F., after which they were cooled for handling.

Groups of brick were then subjected to various baking procedures. Brick of Group No. 1 were placed in a standard moving drier having a temperature schedule of 50° F. per hour with a top temperature of 500° F. and a 24 hour hold at this temperature. The brick were examined upon their exit from the drier and were found to have a rough exterior and some bloating with many fine cracks penetrating the surface up to ¼ inch. By a rough surface, we means one which is not well filled out. It may have some depressions and protrusions in it. It often appears coarse-textured with deposits of fine coke and recondensed volatiles. Several brick were sawed or broken in half and were observed to be baked through completely. However, the presence of numerous cracks rendered the brick unsuitable to withstand the physical shock and abrasion encountered in the oxygen converter. Furthermore a crack in the surface of a block acts as a point of entry for slag and thereby seriously affects the resistance of the block to chemical attack.

Brick of Group No. 2 were placed in a standard gas-fired laboratory reheat kiln and heated at the rate of 60° F. per hour to 600° F. and held for 18 hours at this temperature. These brick were similar in appearance to those of Group No. 1 and, although baked completely through, were of such unsatisfactory physical structure as to be deemed unfit for converter construction.

Brick of Group No. 3 were placed in a muffle kiln designed to heat articles in a closed system wherein the brick were heated to about 600° F. at a rate of about 50° F. per hour and held at this temperature for 20 hours. The brick when removed from the kiln exhibited smooth surfaces and no exterior cracking was apparent. The brick were baked completely through and exhibited no internal cracking. The brick, while not as strong as the unbaked samples, displayed more than adequate strength to be usable in the oxygen converter.

Brick of Group No. 4 were placed in a muffle kiln and heated to 1000° F. at a rate of about 100° F. per hour and held at this temperature for one hour. They appeared to be baked completely through, exhibited fairly smooth surfaces, and were free of external and internal cracking. The baked brick, while not nearly as strong as those of Group No. 3, maintained sufficient strength to be usable in the oxygen converter. Also, these brick showed evidence of hydration after a month's storage whereas those baked at lower temperatures did not.

Brick of Group No. 5 were placed in a muffle kiln and heated to 450° F. at a rate of about 25° F. per hour and held at this temperature for 24 hours. The brick were baked completely through, demonstrated smooth surfaces, and showed neither external nor internal cracking. The strength was sufficient to permit use in the oxygen vessel.

Brick of Group No. 6 were placed in a muffle kiln and heated to 1500° F. at a rate of about 50° F. per hour and held at this temperature for one hour. The brick were baked completely through and exhibited no external or internal flaws. However, the strength of the brick had decreased to such an extent as to render them unsuitable for lining an oxygen converter. A modulus of rupture of at least 600 p.s.i. is considered mandatory to permit handling and shipping.

The data obtained with respect to the foregoing six groups of bricks are set forth in the following table.

The brick of Groups 3, 4 and 5 were satisfactory and were the only ones baked in accordance with the discoveries constituting this invention. The only limitation of this invention that was not followed in baking the brick of Groups 1 and 2 is that normal atmospheric pressure rather than superatmospheric pressure was used. This constitutes significant evidence of the criticality of the pressure limitation. The only limitation of the invention not followed in baking the brick in Group 6 is the limitation on the temperature of baking. The higher temperature used with brick of Group 6 resulted in warped brick, and a strength so low that they could not be used. Further, the cracking and bloating present in Groups 1 and 2 severely curtailed their period of resistance to hydration. Likewise, the higher temperature used in Group 6 adversely affected the resistance to hydration of these brick.

While we do not desire to be limited by theory we have postulated that the success of the invention is influenced by the following considerations. The pressure that is used prevents rapid volatilization of the light fractions in the pitch, which otherwise would lead to cracking and bloating. The moderate heating rate contributes to that end also, because heating too rapidly would risk rapid volatilization despite the elevated pressure.

Pitch is composed of relatively short, low molecular weight carbon chains. The basic unit of these chains is the aromatic or benzene ring. Polymerization is the process which arts to change (by union of two or more molecules of the same kind) the basic unit into another compound having the same elements in the same proportions, but a higher molecular weight and different physical properties. The individual unit is termed a monomer, while the compound formed from the union of two or more monomers is described as a polymer. Polymerization is a chemical reaction and is dependent upon the material itself (type of monomer), temperature, and time of reaction. The rate of reaction is also an important consideration in the process of polymerization, and is greatly affected by temperature. For any given system, there exists an optimum rate of polymerization which determines the degree of orderly arragement of the monomeric units. Referring specifically to pitch, when heat is applied, the aromatic rings making up the chains are polymerized into a higher molecular weight system which ultimately leads to the formation of coke or graphite. Too rapid baking results in excessive volitilization of the light fractions in the pitch with a consequent reduction in polymerization. We have concluded that good polymerization is required to insure a body possessing sufficient strength for handling and shipping and possessing good resistance to hydration. Therefore, we have concluded that proper baking technique requires careful temperature control to assure satisfactory polymerization and means for controlling the rate of escape of volatiles.

This conclusion is borne out by the foregoing data. Where temperatures over about 1000° F. are employed, excessive volatilization occurs but no ceramic bond is formed and the temperature is so high that the desired polymers are not formed, resulting in brick too weak to be usable and deleteriously affecting the resistance to hydration of the brick.

*Table*

| Type Kiln | Drier | Reheat | Muffle Kiln | | | |
|---|---|---|---|---|---|---|
| Temperature | 500° | 600° | 600° | 1,000° | 450° | 1,500°. |
| Rate | 50° | 60° | 50° | 100° | 25° | 50°. |
| Group | 1 | 2 | 3 | 4 | 5 | 6. |
| Density, pcf.: | | | | | | |
| After pressing | 185 | 185 | 185 | 185 | 185 | 185. |
| After baking | | | 177 | 173 | 179 | 170. |
| Surface Appearance After baking | Bloated, Cracked. | Bloated, Cracked. | Smooth | Fairly Smooth. | Smooth | Rough Brick. Warped. |
| Modulus of Rupture, p.s.i.: | | | | | | |
| After pressing | 1,430 | 1,430 | 1,430 | 1,430 | 1,430 | 1,430. |
| After baking | Cracked | Cracked | 975 | 700 | 900 | 500. |

It will be evident that modification of the invention can be made without departing from its scope. Indeed, one such modification that we have made improves the surface characteristics of the refractory shapes even further in freedom from bloat holes and cracks. This embodiment involves coating the surfaces of the shapes prior to baking with a mixture of pitch and creosote. The exact function of this coating is not known but we have found that when this mixture is applied, by brushing, dipping, spraying, and the like, an even smoother surface results after the brick are baked. Economics and ease of handling have led to an 80 weight percent creosote 20 weight percent pitch mix although other combinations, i.e. 60 to 90 percent of creosote and the remainder pitch, perform equally well. The pitch is generally heated to its softening point and then blended into the creosote. The brick are then dipped into or sprayed with the mixture and, upon removal, are placed in a muffle-type kiln for baking and baked as before.

EXAMPLE II

A refractory batch similar in all respects to that discussed under Example I above, but in which we use about 6 parts powdered hard pitch only as the bonding material. This mix must be heated to at least 500° F. for forming. Shapes are made from this batch and then baked in a manner otherwise similar in all respects to that discussed above.

EXAMPLE III

A brick mix similar to that described above under Example I, mixed with about 2½% of lignin liquor (an aqueous brick tempering material) and about 5% of powdered hard pitch. Brick are formed from the batch at room temperature (nominally 72° F.), and then heated to 500° F. to set the pitch. The brick are subsequently baked according to the methods of the instant invention.

The foregoing establishes that this invention is applicable to brick with mixtures of liquid and powdered pitch and, also, to brick bonded with powdered hard pitch. It is applicable to tar bonded brick, in which the ingredients are mixed at room temperature with normal brickmaking bonds such as lignin liquor; which brick are subsequently heated to set the carbonaceous materials before they are baked according to the preferred methods of this invention. Still further, it is possible to form a hot or cold brick mix of size graded refractory material and liquid and/or powdered liquid pitch, and to bake the brick in the press. For example, induction heating means can be included in the press to bake the carbonaceous materials while they are still under pressure in the press, while retaining the vapors given off by the carbonaceous material in contact with the refractory material in the press cavity.

From the foregoing discussion and data, it is evident that our invention provides an effective process for baking tar or pitch bonded refractory shapes such as brick, in which a thoroughly baked product of good strength results that is free from cracks, bloating or warpage. In the discussion, all percentages given are by weight unless otherwise specified. It will also be understood that while each of the above examples relates to pressed brick, our invention is equally applicable to shapes of many sizes and configurations and formed by methods other than pressing, such as vibrating, ramming, jolting, and the like.

In accordance with the provisions of the patent statutes, we have explained the principle of our invention and have described what we now consider to represent its best embodiment. However, we desire to have it understood that, within the scope of the present claims, the invention may be practiced otherwise than as specifically described.

Having thus described our invention in detail and with sufficient particularity as to enable those skilled in the art to practice it, what is desired to have protected by Letters Patent is set forth in the following claims.

We claim:

1. In the method of baking a previously formed tar bonded refractory shape, the improvement comprising heating said shape at a rate of about 25° to 100° F. per hour to a temperature within the range of about 400° to 1000° F. to bake said shape while retaining vapors from said tar in contact therewith.

2. In the baking of a previously formed tar bonded refractory shape, the improvement comprising autogenously developing a superatmospheric pressure in contact with said shape while baking it by heating it to a baking temperature in the range of 400° F. to 1000° F. at a rate of 25° to 100° F. per hour.

3. A process in accordance with claim 2 in which said refractory shape is a basic refractory brick.

4. A method of preparing a baked tar bonded basic refractory, comprising initially forming a refractory shape from dead burned basic refractories and a tar bonding agent, thereafter heating said shape at a temperature of 25° to 100° F. per hour to a temperature within the range of about 400° to 1000° F. and maintaining said temperature for about 1 to 24 hours while retaining vapors from said tar in contact therewith.

5. A process in accordance with claim 4 in which said refractory shape is coated on its surfaces with a mixture of tar and creosote prior to baking.

6. The method of claim 4 in which powdered hard pitch only is used as the tar bonding agent.

7. The method of claim 4 in which a mixture of liquid and powdered pitch is used as the tar bonding agent.

8. The method of claim 4 in which the tar bonding agent is mixed with the basic refractories at room temperature and then heated for the initial forming.

9. The method of claim 8 in which an aqueous tempering material is mixed with the refractories and tar bonding agent for the initial forming.

10. A method of preparing a baked tar bonded basic refractory, comprising initially forming a refractory shape from dead burned basic refractories and a tar bonding agent in a brick making cavity in a brick making machine, heating the mixture of refractories and tar bonding agent in the brick cavity, said heating being at a temperature of 25° to 100° F. per hour to a temperature within the range of about 400° to 1000° F. and maintaining said temperature for about 1 to 24 hours while retaining vapors from said tar in contact with the basic refractories in said cavity.

11. A method of preparing a baked tar bonded basic refractory, comprising initially forming a refractory shape from dead burned basic refractories and a tar bonding agent, then autogenously developing a superatmospheric pressure in contact with said shape while baking it by heating it to a baking temperature in the range of 400° to 1000° F. at a rate of 25° to 100° F. per hour, and maintaining said temperature for about 1 to 24 hours.

References Cited by the Examiner

UNITED STATES PATENTS

| 1,549,867 | 8/25 | Graveman | 18—47.5 |
| 1,941,280 | 12/33 | Shoeld | 18—47.5 |
| 3,015,850 | 1/62 | Rusoff et al. | 25—157 |

FOREIGN PATENTS 614,742  2/63  Canada.

ROBERT F. WHITE, *Primary Examiner.*

ALEXANDER H. BRODMERKEL, *Examiner.*